350-1.7
XR 3,733,217
SEARCH ROOM
May 15, 1973 J. S. SEELY ET AL 3,733,217
METHOD OF MAKING INTERFERENCE FILTERS
Original Filed Sept. 16, 1969
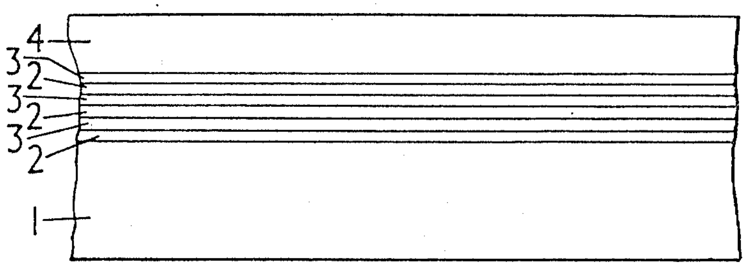

United States Patent Office 3,733,217

Patented May 15, 1973

3,733,217

METHOD OF MAKING INTERFERENCE FILTERS

John Scott Seeley and Stanley Desmond Smith, Berkshire, and Frederick Stafford Ritchie, Newcastle-upon-Tyne, England, assignors to Sir Howard Grubb Parsons & Company Limited, Walkergate, Newcastle-upon-Tyne, England Original application Sept. 16, 1969, Ser. No. 858,302, now Patent No. 3,614,188. Divided and this application July 28, 1971, Ser. No. 166,689

Claims priority, application Great Britain, Oct. 23, 1968, 50,381/68

Int. Cl. G02b *5/28*

U.S. Cl. 117—33.3 2 Claims

ABSTRACT OF THE DISCLOSURE

A method of making an interference multi-layer filter for use with infra-red radiation, which includes the steps of depositing in vacuo on a substrate, selected from the group comprising germanium, silicon and crystal quartz, alternate layers of caesium iodide and a material of different refractive index selected from the group comprising germanium, silicon, tellurium and lead telluride. The substrate is heated to a temperature in the range of 130–230° C. and after deposition of the alternate layers the substrate is allowed to cool down to a temperature of 20° C. at a rate not exceeding 1° C. per minute before admitting air at ambient temperature into the vacuum chamber.

This application is a division of application Ser. No. 858,302, filed Sept. 16, 1969, now U.S. Pat. No. 3,614,-188.

This invention relates to an improved method of making interference filters for use with infra-red radiation. Interference filters are well known and commonly used devices for passing radiation of selected wavelengths and simultaneously reflecting and/or absorbing unwanted wavelengths. Such filters consist essentially of alternating layers of a material having a high index of refraction usually above 2, and a material having a low index of refraction usually below 2. The filters are constructed by evaporating the materials in a high vacuum and depositing them on to a suitable substrate. The interference filter of the invention is illustrated in the diagrammatic drawing.

Although the theory of optical interference filters is well established and understood, there are practical difficulties in the design and manufacture of such filters for use with infra-red radiation and especially for wavelengths greater than 10μ and up to at least 80μ. These problems are especially acute with respect to the low refractive index material. It is essential that the absorption in the materials be low throughout the desired wavelength range. It is also important that the materials can be deposited on the substrate in the relatively large thicknesses which are required without parts of the layers breaking off.

The present invention consists in a method of making an interference multi-layer filter for use with infra-red radiation, which includes the steps of depositing in vacuo on a substrate, selected from the group comprising germanium, silicon and crystal quartz, alternate layers of caesium iodide and a material of different refractive index selected from the group comprising germanium, silicon, tellurium and lead telluride.

Caesium iodide which has a refractive index of approximately 1.7 at a wavelength of 20μ is used as the low refractive index material and the high refractive index material, may be of germanium, silicon, tellurium or lead telluride. The refractive index of germanium is of the order of 4.

The substrate may be of germanium, silicon or crystal quartz, germanium being preferred for the wavelength region 1.7–20μ and silicon for the wavelength region greater than 20μ. Quartz may be used for wavelengths less than 5μ and greater than 40μ.

The use of caesium iodide minimises absorption in the wavelength range of operation and it can be deposited in the required thickness without parts of the layers breaking off to any significant extent.

The coefficient of linear expansion of caesium iodide is significantly higher than the coefficient for the other materials used for layers and substrate. For example, the coefficient for caesium iodide is almost eight times greater than that of germanium and such difference can lead to undesirable thermal stress in the multi-layer filter. In accordance with a further feature of the invention this difficulty may be overcome or minimised by heating the substrate during deposition and where necessary varying the temperature of the substrate during deposition of layers of different material.

To protect the caesium iodide layers against effects of atmospheric humidity, the surface of the filter may be coated with a protective layer, for example, a layer of transparent polystyrene 4.

In carrying the invention into effect in one form by way of example as shown in the accompanying diagrammatic drawing, an interference filter for use in the range 5–30μ was formed by deposition on a germanium substrate 1 in vacuo, alternate layers of caesium iodide and germanium 2 and 3 respectively. The first germanium layer was deposited at a substrate temperature in the range 220–230° C. and all the caesium iodide and subsequent germanium layers were deposited at 130° C. After completion the filter was allowed to cool down slowly in vacuo to about 20° C. at a rate not in excess of 0.5° C. per minute.

In another example a multi-layer filter for use in the wavelength range 30–100μ, consisted of alternate layers of germanium and caesium iodide deposited on a silicon substrate. The first two germanium layers were deposited at a substrate temperature of 220–230° C. and all the layers of caesium iodide and the remaining germanium layers at a temperature of 130° C. The rate of cooling after completion was kept below 0.5° C. per minute and the filter allowed to cool to 20° C. before air was admitted to the vacuum chamber.

The temperature cycling of the substrate in the above examples can proceed at a faster rate than the final rate of cooling. Typically, heating and cooling rates of 1½° C. per minute can be tolerated during this part of the process.

A filter for use in the wavelength region 1–5μ consisted of alternate layers of germanium and caesium iodide deposited in vacuo on a substrate of germanium. All the layers were deposited at 130° C. and the substrate allowed to cool down in vacuo to ambient temperature 20° C. with a rate of cooling not exceeding 1° C. per minute.

In a further example, a filter for use in the range 4–80μ was formed using a silicon or germanium substrate and alternate layers of caesium iodide and lead telluride deposited at 140° C. in vacuo. The filter was allowed to cool to ambient temperature (20° C.) at 1° C. per minute. For the range 4–20μ, a germanium substrate was used otherwise the temperature was the same.

Because caesium iodide is slightly hygroscopic and very soluble in water, the filters for use in the range 20–80μ were protected by coating the surface of the filter with polystyrene provided the polystyrene does not have absorption bands which would affect the performance of the filter. In a typical case a 4% solution of polystyrene in toluene was brushed evenly over the filter surface the toluene quickly evaporating to leave a thin layer of polystyrene.

The thickness of the polystyrene coating can be increased by repeated application of the solution. Polystyrene is transparent for wavelengths greater than 16$\mu$ so that it can be used as a protective coating for the far infra-red region.

Whilst in the above examples caesium iodide has been used with layers of germanium and substrates of germanium, materials such as silicon or crystal quartz can be used for the substrate and silicon, tellurium or lead telluride for the layers.

We claim:

1. A method of making an interference multi-layer filter for use with infra-red radiation, which includes the steps of depositing in a vacuum chamber on a substrate, selected from the group consisting of germanium, silicon and crystal quartz, alternate layers of caesium iodide and a material of different refractive index selected from the group consisting of germanium, silicon, tellurium and lead telluride, said substrate being heated to a temperature in the range 130–230° C., and after deposition of the alternate layers and substrate being allowed to cool down to a temperature of 20° C. at a rate not exceeding 1° C. per minute, before admitting air at ambient temperature into the vacuum chamber.

2. A method of making an interference multi-layer filter for use with infra-red radiation, which includes the steps of depositing in a vacuum chamber on a substrate, selected from the group consisting of germanium, silicon and crystal quartz, alternate layers of caesium iodide and a material of different refractive index selected from the group consisting of germanium, silicon, tellurium and lead telluride, said substrate being heated to a temperature in the upper portion of the range 130–230° C., at least one of said alternate layers being deposited, said substrate being cooled to a temperature in the lower portion of said range, at least one further alternate layer being deposited at the latter temperature, and after deposition of the alternate layers said substrate being allowed to cool down to a temperature of 20° C. at a rate not exceeding 1° C. per minute, before admitting air at ambient temperature into the vacuum chamber.

References Cited

UNITED STATES PATENTS

| | | | |
|---|---|---|---|
| 2,512,257 | 6/1950 | Pfond | 117—33.3 |
| 3,188,513 | 6/1965 | Hansler | 117—33.3 |
| 3,312,572 | 4/1967 | Norton et al. | 117—106 A |
| 3,279,938 | 10/1966 | Schneeberger | 117—33.3 |

FOREIGN PATENTS

| | | | |
|---|---|---|---|
| 742,530 | 12/1955 | Great Britain | 350—166 |
| 1,098,305 | 1/1968 | Great Britain | 350—166 |

OTHER REFERENCES

Holland, L., Vacuum Deposition of Thin Films, N.Y., John Wiley & Sons (1956), pp. 489–490, especially lines 9–10, p. 490.

Ullrich, O., Optical Coatings, in Vapor Deposition, ed. by C. Powell, J. Oxley, and T. Bloches, N.Y., John Wiley & Sons (1966), pp. 563–568.

McCarthy, D. E., The Reflection and Transmission of Infrared Materials: I, Spectrafrom 2–50 Micons, in Applied Optics 216, pp. 591–603, June 1963, 350–1.

Steudel, A., Preparation et Propriétés de Couches Refléchissantes pour le Fabry Perot dans I'Ultraviolet, in Le Journel de Physique et le Radium 19, March 1958, pp. 312–318.

Bode, D. E., Lead Salt Detectors, in Physics of Thin Films 3 (1966), p. 287.

Baumeister, P. W., Notes on Multilayer Optical Filters, University of Rochester, N.Y., Inst. of Optics, MIL–HOBK–140, pp. 20–15 to 20–17.

Stoty et al., "Fabry-Perot-Interferometerverspiegelunger . . ." Zeitschrift für Physik, ISI, pp. 233–240 (1950).

WILLIAM D. MARTIN, Primary Examiner

W. H. SCHMIDT, Assistant Examiner

U.S. Cl. X.R.

117—69, 71 R, 71M, 106 R, 106 A, 119, 119.2